United States Patent [19]
Sturges

[11] Patent Number: 5,572,198
[45] Date of Patent: Nov. 5, 1996

[54] METHOD AND APPARATUS FOR ROUTING IN REDUCED SWITCH MATRICES TO PROVIDE ONE HUNDRED PERCENT COVERAGE

[75] Inventor: Jay Sturges, Orangevale, Calif.

[73] Assignee: Intel Corporation, Santa Clara, Calif.

[21] Appl. No.: 279,954

[22] Filed: Jul. 25, 1994

[51] Int. Cl.[6] .................................................. H04B 3/38
[52] U.S. Cl. ........................ 340/827; 340/825.800; 340/825.830; 340/826; 326/41
[58] Field of Search .......................... 340/827, 825.79, 340/825.8, 825.83, 826; 370/53, 58.1; 379/248; 326/38, 41

[56] References Cited

U.S. PATENT DOCUMENTS

| | | | |
|---|---|---|---|
| 4,717,844 | 1/1988 | Shima et al. | 340/825.83 |
| 4,989,022 | 1/1991 | Hwang et al. | 340/826 |
| 5,072,217 | 12/1991 | Georgion et al. | 340/825.79 |
| 5,153,463 | 10/1992 | Keiichi | 340/825.83 |
| 5,204,556 | 4/1993 | Shanker | 326/41 |
| 5,276,445 | 1/1994 | Mita et al. | 340/825.79 |
| 5,396,126 | 3/1995 | Britton et al. | 326/41 |

*Primary Examiner*—Michael Horabik
*Assistant Examiner*—Edward Merz
*Attorney, Agent, or Firm*—Blakely, Sokoloff Taylor & Zafman

[57] ABSTRACT

A field programmable gate array in which the pattern of a first smaller switch matrix is continued into a number of other smaller reduced switch matrices necessary to provide full coverage for all of the input conductor combinations at the output conductors.

30 Claims, 6 Drawing Sheets

```
ROW 1 -- 1 -- 2 -- 3 -- 4
         |    |    |    |
         |    |    |    |
ROW 2 -- 5 -- 6 -- 7 -- 8
         |    |    |    |
         |    |    |    |
ROW 3 -- 9 --10 --11 --12
         |    |    |    |
         |    |    |    |
ROW 4 -- 4 -- 1 -- 2 -- 3
         |    |    |    |
         |    |    |    |
ROW 5 -- 8 -- 5 -- 6 -- 7
         |    |    |    |
         |    |    |    |
ROW 6 --12 -- 9 --10 --11
         |    |    |    |
         |    |    |    |
ROW 7 -- 3 -- 4 -- 1 -- 2
         |    |    |    |
         |    |    |    |
ROW 8 -- 7 -- 8 -- 5 -- 6
         |    |    |    |
         |    |    |    |
ROW 9 --11 --12 -- 9 --10
         |    |    |    |
         |    |    |    |
        OUT1 OUT2 OUT3 OUT4
```

FIG. 3A

|         | OUT 1 | OUT 2 | OUT 3 | OUT 4 |
|---------|-------|-------|-------|-------|
| INPUT 1 | 1 | 1 | 1 | 0 |
| INPUT 2 | 0 | 1 | 1 | 1 |
| INPUT 3 | 1 | 0 | 1 | 1 |
| INPUT 4 | 1 | 1 | 0 | 1 |
| INPUT 5 | 1 | 1 | 1 | 0 |
| INPUT 6 | 0 | 1 | 1 | 1 |
| INPUT 7 | 1 | 0 | 1 | 1 |
| INPUT 8 | 1 | 1 | 0 | 1 |
| INPUT 9 | 1 | 1 | 1 | 0 |
| INPUT 10 | 0 | 1 | 1 | 1 |
| INPUT 11 | 1 | 0 | 1 | 1 |
| INPUT 12 | 1 | 1 | 0 | 1 |

METHOD AND APPARATUS FOR ROUTING IN REDUCED SWITCH MATRICES TO PROVIDE ONE HUNDRED PERCENT COVERAGE

BACKGROUND OF THE INVENTION

1. Field Of The Invention

This invention relates to digital systems, and more particularly, to methods and apparatus for providing complete routing coverage utilizing reduced switch matrices.

2. History Of The Prior Art

Switch matrices allow combinations of signals appearing on a large number of input signal conductors to be provided at a more limited number of output conductors. Essentially, a switch matrix comprises a first set of input conductors and a second set of output conductors. The input conductors may be selectively joined to the set of output conductors by switching devices. In this manner, selective combinations of a typically large number of input signals may be furnished to a smaller number of output conductors. In a full (or one hundred percent) connection matrix all of the of the input conductors may be selectively joined to each of the output conductors. Such an arrangement may be pictured as rows and columns of intersecting conductors with a switch which may be closed at each intersection.

Switch matrices are used for many purposes in computer and other digital systems. For example, switch matrices are an essential part of field programmable logic arrays. Field programmable logic arrays may be used in digital systems to provide particular logic operations using binary input signals. A programmable logic array includes a switch matrix the output conductors of which are connected to gates which allow a plurality of input values to be manipulated in accordance with various Boolean functions. By connecting the input conductors to various AND gates and the outputs of the AND gates (product terms) to various OR gates, a particular Boolean function which is the sum of the product terms produced by the AND gates may be furnished at the output of any OR gate. The Boolean output function provided at the output of each of the OR gates is programmable by a user by programming the connections to be made by the switching devices between the input conductors and the output conductors of the switch matrix using devices such as electrically programmable read only memory (EPROM) cells, fuses, or flash erasable electrically programmable read only memory (EEPROM) cells. Normally, a switch matrix is manufactured with the switching devices in place; and a user programs the switching devices necessary to provide the connections for the logic functions the user desires.

A full connection switch matrix includes physical switching devices which allow all of the input conductors to connect to all of the output conductors. The provision of switching devices at each intersection between input and output conductors requires a large amount of die area. In a full connection matrix where each input conductor may be connected to each output conductor, the switching devices may occupy one-quarter of the entire die area. Consequently, field programmable switch matrices often use less than a switching device at each intersection in order to reduce the die area used and to increase the speed of operation by reducing the length of the various conductors within the matrix. One arrangement for providing a reduced switch matrix has been able to achieve full coverage of all combinations of input conductors to output conductors by assigning switches to connect input and output conductors on a incrementing serial basis which shifts each time all of the input conductors have been assigned connections to output conductors. Thus, in a matrix of eight input conductors and four output conductors, the input conductors are serially assigned switches allowing connection to each of the output conductors (also on a serial basis) in the following pattern where each two digits indicate first the input conductor and second the output conductor to which it may be connected (11, 22, 33, 44, 51, 62, 73, 84). When all of the input conductors have been assigned, the pattern is repeated but the connections are shifted by some amount (e.g., 12, 23, 34, 41, 52, 63, 74, 81). The pattern continues to be repeated, shifting each sequence by the same number, until a predetermined number of sequences of input conductors have been assigned. This method of assigning switches to connect input and output conductors has been able to achieve full coverage of input combinations with a reduction in the number of switches to approximately sixty percent of the number required in a full connection matrix.

There are a class of field programmable gate arrays in which, rather than a single switch matrix, a plurality of small switching matrices are utilized in order to provide the output signals which are sent to the AND and OR gates to provide the logical output signals. In these gate arrays, in order to keep the size of the switch matrices to a minimum, individual matrices designed in the manner described above have been reduced to one-half the number of switches of a full connection matrix. To realize this number of switches in the switch matrices designed with a serial pattern of connections which shifts with each cycle of input conductors, those switches of the reduced matrix greater than is necessary to provide full coverage have simply been eliminated by truncating the arrangement so that only a number of sequences of switches equal to one-half of the switches of a full connection matrix are used. These physical switches are arranged so that they require only one-half the die area required by a full connection matrix and provide almost all of the output combinations available in a full connection matrix. A small matrix of this sort is duplicated the number of times required for the particular gate array and each matrix is associated with an individual set of AND and OR gates placed at each of the physical positions convenient to the layout to provide the complete gate array.

Unfortunately, such a reduced matrix does not provide full coverage of all of the possible combinations of input conductors. It is often desirable to assure a user that full coverage is provided. Without that assurance, it is very difficult to ascertain that coverage for desired combinations exist without actually utilizing the gate array, and determining whether it fails or not. Moreover, gate arrays are often reprogrammed to provide new logic functions after some initial period of use. This may occur, for example, when other portions of circuitry with which the gate array is used are updated or added to. Thus a determination initially made that coverage is sufficient may be invalid at some later date.

Recently another arrangement has been devised which reduces the number of switches utilized in a switching matrix by an even greater amount to a fraction of the number used in a full switch matrix. This switch matrix arrangement includes a number of input conductors and a number of output conductors intersecting in row and column fashion, and having switching devices placed on a random basis in each row joining selected ones of the input conductors to selected ones of the output conductors at the logical intersections to make connections between input and output conductors. In one embodiment, the fraction of switching devices in each row and each column is equal to the fraction of the total number of switching devices divided by the total number of intersections in the matrix. It has been found that such a switching matrix when carefully selected provides almost all possible combinations of connections between the input and the output conductors even though the number of switching devices is reduced to one-half of the number used in a full connection switching matrix. Since these matrices typically use one-half the number of switching devices used in a full connection matrix, a plurality of identical random switch matrices may be conveniently used in place of the shifting sequence arrangements described above to provide field programmable gate arrays.

However, some combinations of input signals are simply not available in either form of reduced switching matrix where the number of switches is reduced to one-half. It is desirable to guarantee to a user of a field programmable gate array or other device using these reduced size matrices that all possible combinations of input conductors are available while still utilizing reduced switch matrices designed in the manner described above.

SUMMARY OF THE INVENTION

It is, therefore, an object of the present invention to provide an improved field programmable gate array.

It is another more specific object of the present invention to provide a field programmable gate array which is constructed of a number of smaller grays each having its smaller switch matrix yet which offers full coverage of all combinations of input signals.

These and other objects of the present invention are realized in a field programmable gate array in which the pattern of a first smaller switch matrix is continued into a number of other smaller switch matrices necessary to provide full coverage.

These and other objects and features of the invention will be better understood by reference to the detailed description which follows taken together with the drawings in which like elements are referred to by like designations throughout the several views.

BRIEF DESCRIPTION OF THE DRAWINGS

FIG. 3b is a second diagram illustrating the pattern of switch placement in a switch array providing less than full coverage illustrated in FIG. 3a.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
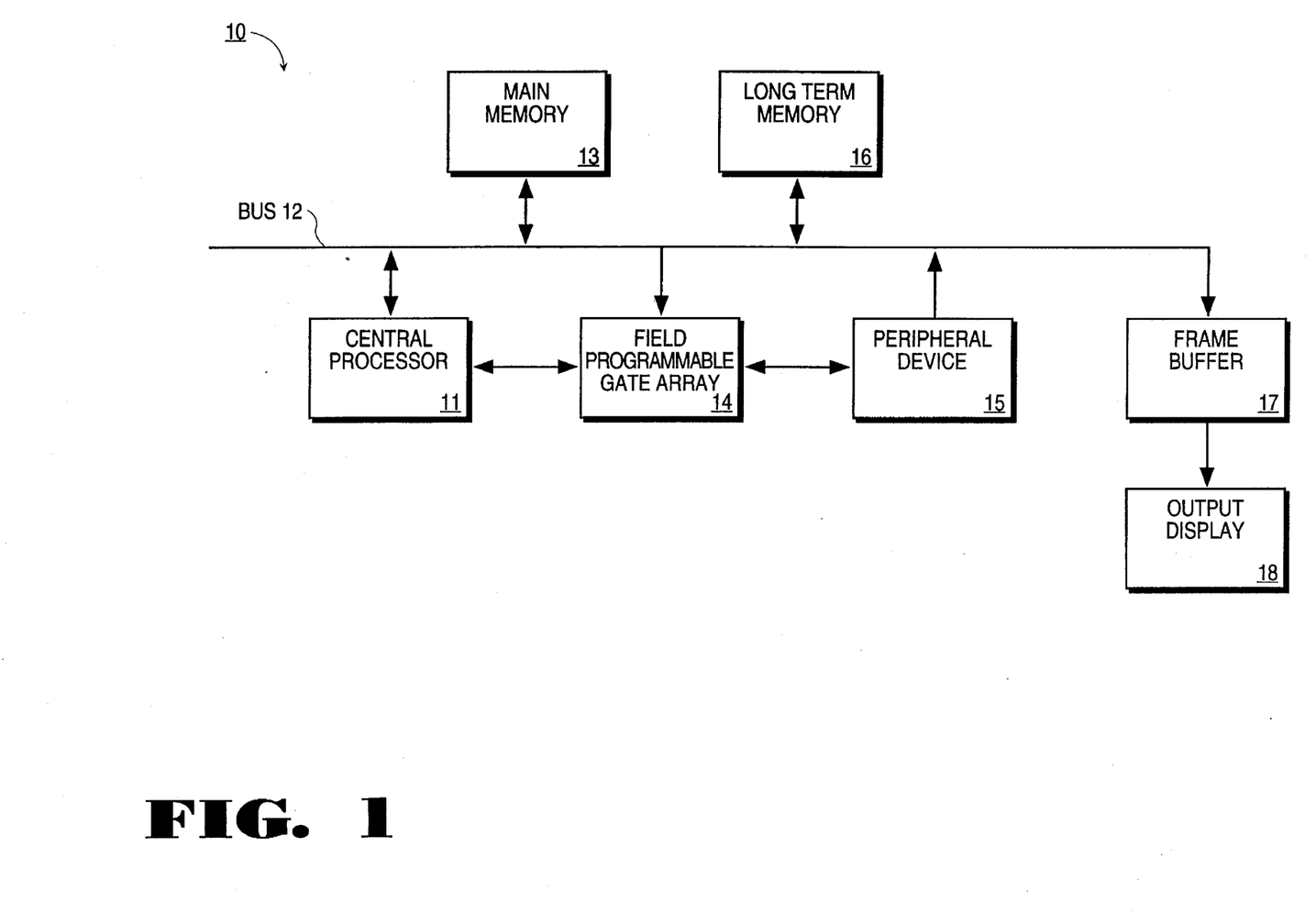
FIG. 1 is a block diagram of a digital system which may utilize the present invention.

Referring now to FIG. 1, there is illustrated a computer system 10. The system 10 includes a central processing unit 11 which executes the various instructions provided to control the operations of the computer system 10. The central processing unit 11 is joined to a bus 12 adapted to carry information to various components of the system 10. Joined to the bus 12 is main memory 13 which is typically constructed of dynamic random access memory arranged in a manner well known to those skilled in the prior art to store information during a period in which power is provided to the system 10. Also connected to the bus 12 are various peripheral components such as long term memory 16 and circuitry such as a frame buffer 17 to which data may be written which is to be transferred to an output device such as a monitor 18 for display.

Also joined to the bus 12 is field programmable gate array 14 which may utilize arrays of flash EEPROM memory cells or other cells adapted to be programmed to define the logic functions desired for the gate array. Such a gate array may, for example, be utilized to provide a DRAM memory controller by which the central processing unit 11 may control the operation of main memory 13. In order to illustrate the variety of possible uses of the field programmable gate array 14, the array is shown in FIG. 1 connecting the central processing unit 11 to a generalized peripheral device 15 to allow the processing unit 11 to control the peripheral device 15. A programmable logic circuit may include switch matrix circuitry such as that described in this specification. Even though the present invention is described in the context of a field programmable gate array, the invention may be utilized in digital systems in many other contexts. For example, switch matrix circuitry may also be utilized in various other parts of the computer system 10 to provide a number of different functions such as instruction decoding functions associated with operations of processors utilized in various portions of the system. Switch matrix circuitry may also be used in digital processing systems other than computers such as, for example, digital switching systems such as those used in telephone switching systems and similar arrangements.

Figure 2:
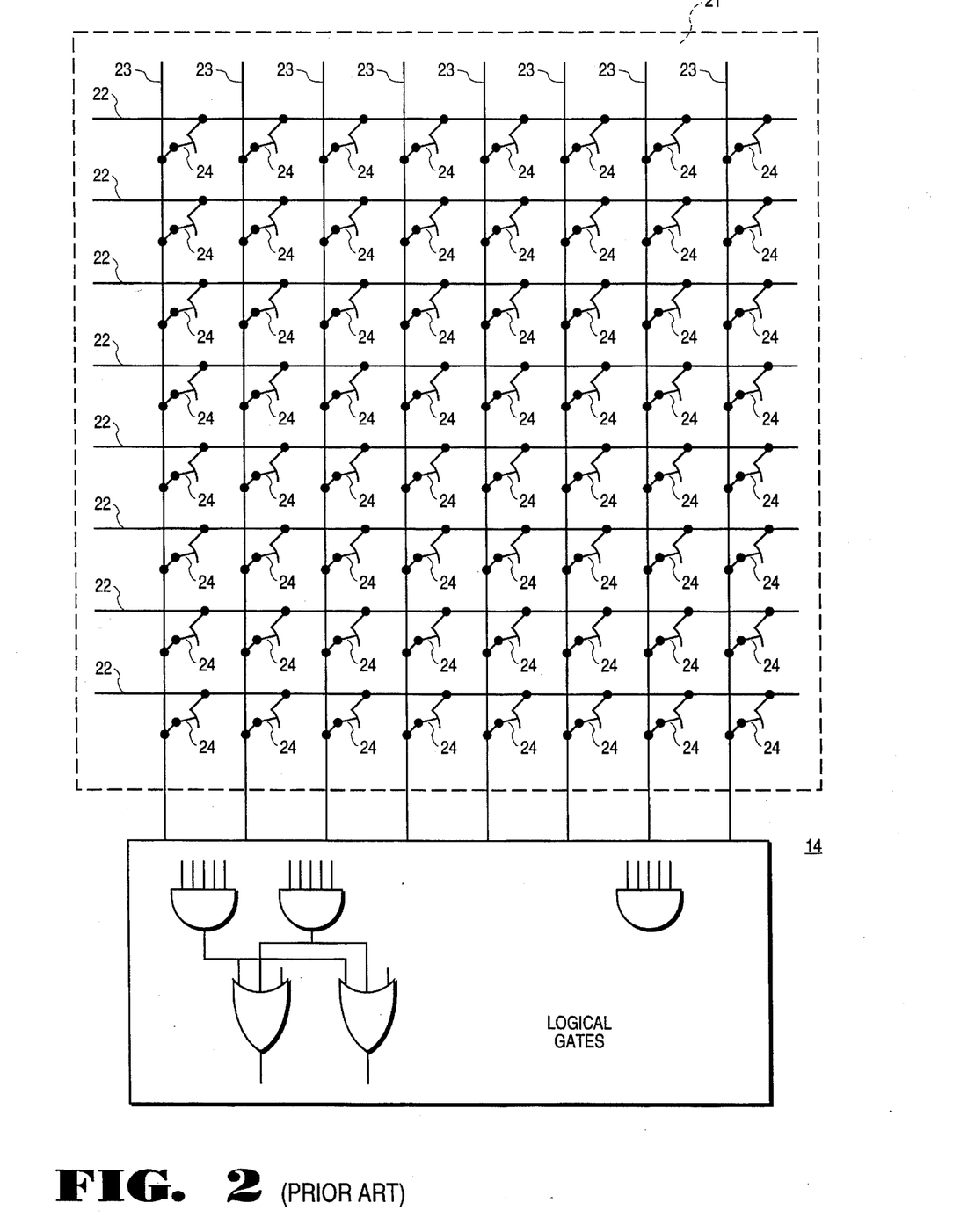
FIG. 2 is a block diagram of a conventional switch matrix of the prior art utilized in a programmable logic array.

FIG. 2 illustrates combinatorial logic in a typical field programmable logic circuit 14 which may be utilized for carrying out various operations in a computer system such as that illustrated in FIG. 1 or in other digital systems. The circuit 14 may include one or more switch matrices 21 which provide a number of output signals in response to some number of input signals. The switch matrix 21 illustrated in FIG. 2 includes input conductors 22 which may be joined to output conductors 23 by a series of switching devices 24. The input conductors 22 are typically, though not necessarily, physically arranged in rows generally at right angles to columns of output conductors 23 allowing each input conductor 22 to be adjacent to each output conductor 23 so that the switching devices 24 may be easily arranged near the intersections to make the necessary connections. Since the physical row and column arrangement is not necessary so long as the input and output conductors are connected to provide this logical arrangement, this is referred to in this specification as a "logical row and column arrangement."

The switching devices 24 may be flash EEPROM devices, EPROM devices, or similar memory devices which retain a condition when power is removed from the circuitry. In FIG. 2, a full connection matrix is illustrated in which a physical switch is available to connect each input conductor to each output conductor. Typically, a field programmable device sold to a user will include a full connection matrix. Such a matrix includes all of the switching devices necessary to make all of the very large number of combinations possible between the input and output conductors. For example, in a 24×10 switch matrix, 240 switches are provided to make the connections at the intersections between the conductors. The user will then program the field programmable device to carry out the particular operations the user desires by programming selected switching devices of the array to make connections which provide the desired logic functions.

In any logic arrangement provided by a field programmable gate array, only certain ones of the switches can be or are used. Even though a gate array may be reprogrammed, many of the switches remain unused throughout the life of the gate array. These switches take up a large area on the die and lengthen the conductors necessary to connect the elements of the array. Consequently, there have been attempts made to reduce the number of switches in a switch matrix.

Figure 3A:
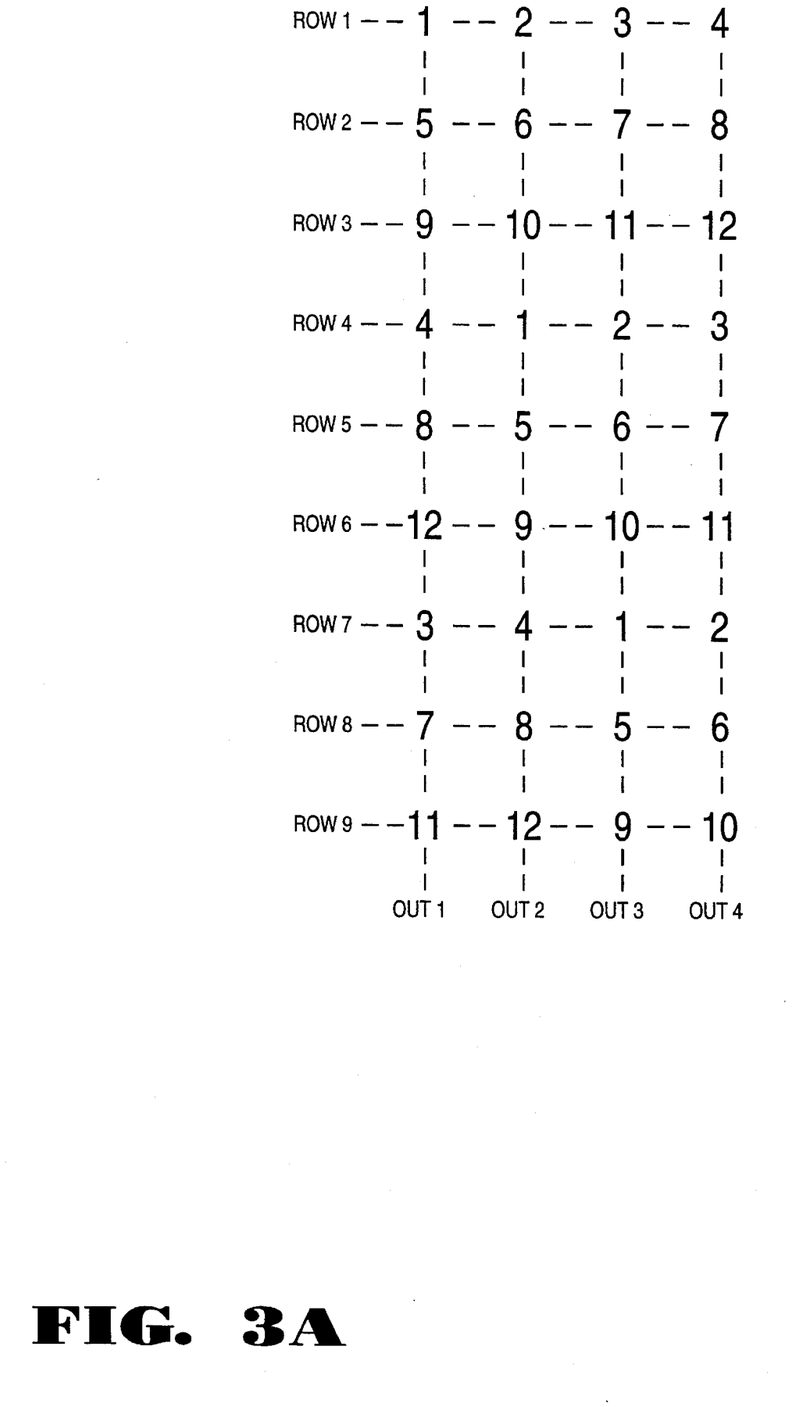
FIG. 3a is a first diagram illustrating one pattern of switch placement in a switch array providing less than full coverage.

One arrangement for providing a reduced switch matrix is able to achieve full coverage of all input conductors to output conductors by assigning switches to connect input and output conductors on a serial basis. The input conductors and the output conductors are each mutually assigned switches on a serial basis, until all of the input conductors have been assigned. Then the pattern is repeated but shifted to the left or the right, in one embodiment by one column of output conductors. Such an arrangement is illustrated in the diagram of FIG. 3a in a switch matrix for joining twelve input conductors to four output conductors. In the figure, each of the four vertical columns represents an output conductor. Column one is at the left and column four is on the right. The horizontal rows shown represent placement of switches to form a compact rectangular arrangement. The pattern by which the switches are provided so that input conductors may be connected to each of these output conductors is illustrated by the number of an input conductor in each of the columns. Thus, commencing at first row at the top of the figure, it may be seen that a switch is provided to connect input conductor one to the output conductor represented by column one, input conductor two to the output conductor represented by column two, input conductor three to the output conductor represented by column three, and input conductor four to the output conductor represented by column four. When the last (fourth) column is reached, the next serial (fifth) input conductor is connected to output conductor one; and the pattern continues. The same situation occurs when the last column four is again reached. When the end of the serial sequence of twelve input conductors is reached in the third horizontal row where input conductor twelve connects to output conductor four, the sequence of input conductors recommences but with the switch positions shifted one (or more) output conductor to the right (or the left) as represented by the columns. When the end of the second serial sequence of twelve input conductors is again reached, the sequence of input conductors repeats again but with the switch positions shifted by another one column to the right (or by the same amount as the previous shift). This method of assigning switches to intersections of input and output conductors continues until a number of sequences of input conductors is reached which is equal to the number of input conductors multiplied by the number of output conductors divided by the number of different input signals. This method of assigning switches to intersections of input and output conductors has been able to achieve full coverage of input combinations with a reduction in the number of switches to 57% of the original number.

Figure 3B:
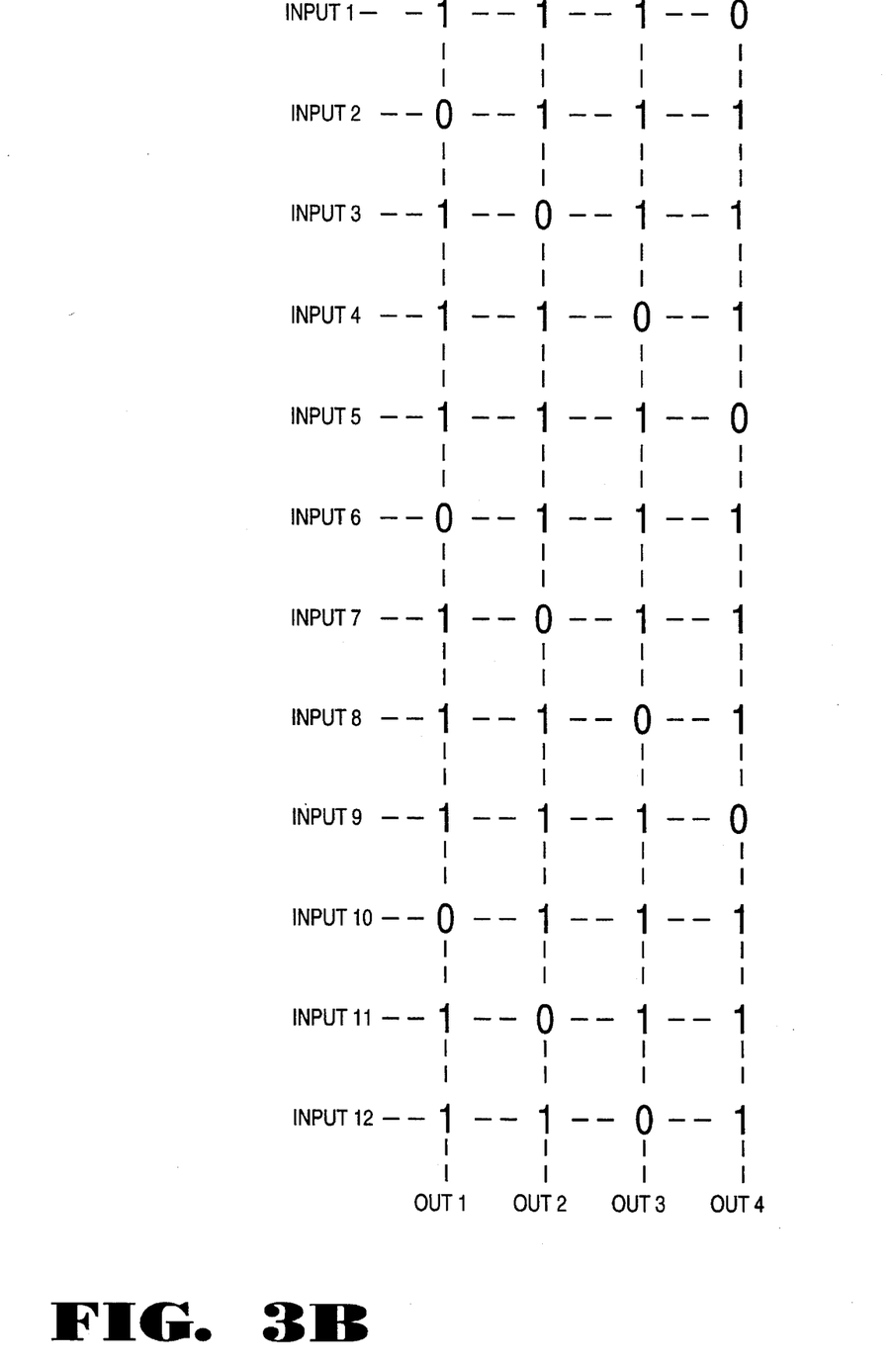

FIG. 3b presents another representation of the same connection pattern as is illustrated in FIG. 3a. In FIG. 3b, horizontal rows represent the twelve input conductors, the vertical columns represent the four output conductors, "1"s represent switches which may connect the input and output conductors at intersections, and "0"s represent the absence of switches at intersections. FIG. 3b is a logical representation of connections rather than a physical layout.

Figure 4:
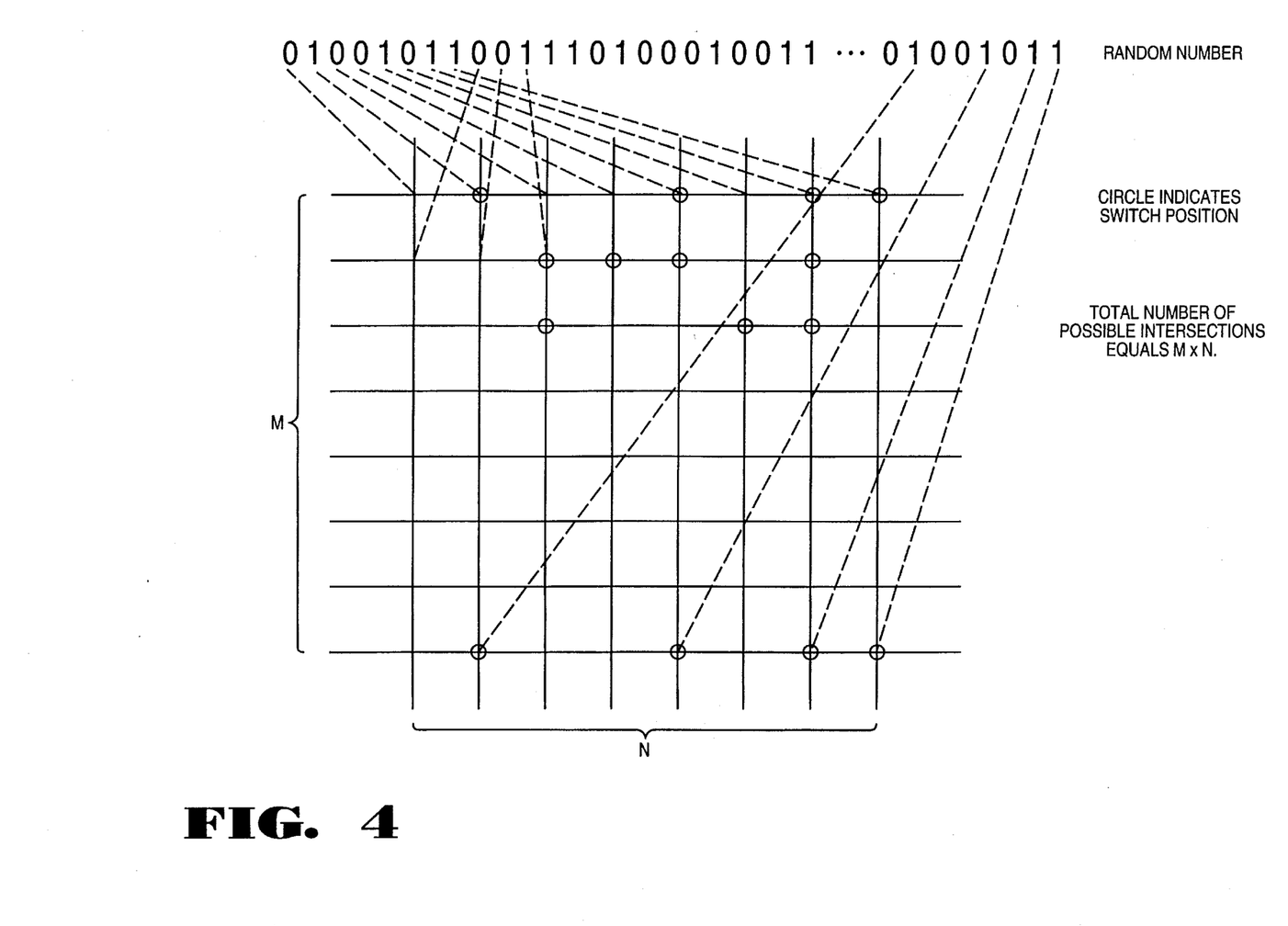
FIG. 4 is a diagram illustrating another pattern of switch placement in a switch array providing less than full coverage.

A random distribution of switching devices is a second pattern of switching devices which generally provides in a minimum size an almost complete set of combinations of input conductors at the output conductors where a reduction in the number of switching devices is attempted. The minimum size is essentially a size too small to provide a random pattern of switching devices. More particularly, if the number of switching devices is reduced to any fraction of the full connection (physical switching devices at each intersection of input and output conductors) size of the switch matrix, and if the number of switching devices physically available to connect all of the input conductors to all of the output conductors are placed at random throughout all of the possible intersecting positions, then almost all combinations of input signals will be available at the output conductors for that reduced size switch matrix. This may be easily accomplished by generating a random binary number having a length equal to the total number of possible intersections and a total of one values equal to the fraction desired multiplied by the total number of possible intersections. If the binary number is then parsed into portions equal in size to the number of output conductors, each portion of the binary number is assigned to the intersections available between one input conductor and all output conductors, and switching devices are placed at intersections indicated by one values, then a random distribution of switches will be attained. Such a random distribution will make almost all permissible combinations of input signals available at the output conductors for that reduced size switch matrix. It will be apparent that the coverage offered by such a fractional matrix will improve as the size of the matrix increases above the minimum size described above. Such a switching matrix is illustrated in FIG. 4 in which (as with FIG. 3b) the columns represent output conductors, the horizontal rows illustrate input conductors, one values illustrate switches at intersections of input and output conductors, and zeros represent the absence of switches at intersections.

The coverage offered by a random pattern of switching devices may be improved to some extent, especially in smaller matrices, by placing some constraints upon the distribution of switching devices. For example, if the number of switching devices connecting each of the input conductors to all of the output conductors is essentially the same for each input conductor or for each output conductor, then the coverage will be improved. This may be attained by providing a random number for each input conductor with the number of one values indicating switches equal to the fraction to which the total number of switches is reduced multiplied by the number of output conductors. The coverage may be further improved by assuring that additionally the same number of switches are provided to connect to each output conductor.

This second random pattern provides almost complete coverage for combinations of input conductors available on the output conductors when the number of switches is reduced to one-half the number available in a full connection switch matrix.

Figure 5:
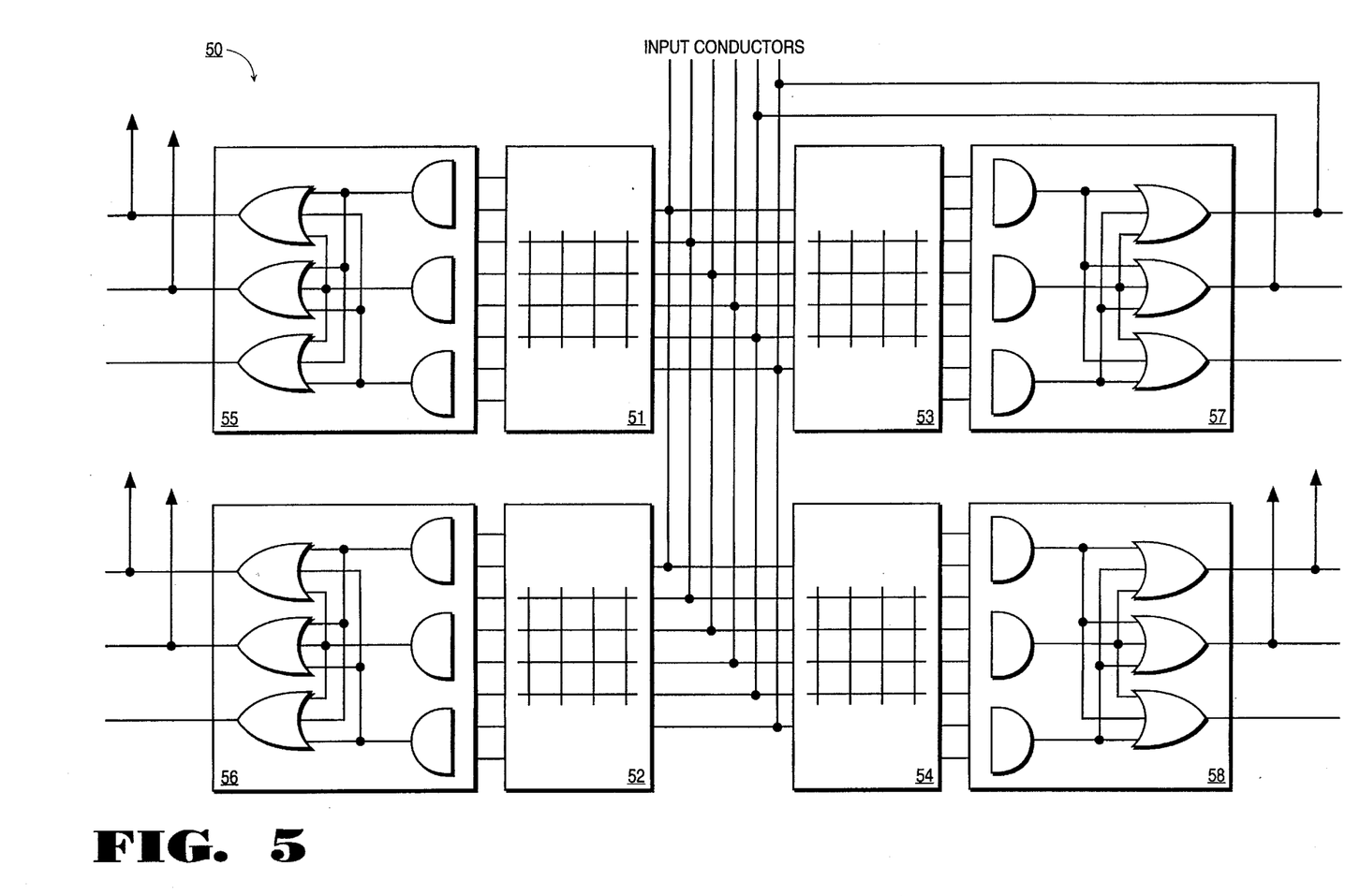
FIG. 5 is a block diagram of a field programmable gate array which may utilize the present invention.

As was mentioned above, there are a number of field programmable gate arrays in which the switches utilized are separated in individual smaller switch matrices in order to better arrange the components on an integrated circuit chip. FIG. 5 illustrates such an arrangement. In FIG. 5, a gate array 50 includes four individual switch matrices 51–54. Each of the matrices 51–54 provides input signals to one of four individual sets of AND and OR gates 55–58. The output signals provided by the OR gates of the sets 55–58 are the individual output functions provided by the gate array 50.

Typically, the individual switch matrices 51–54 are identical. Consequently, the combinations of input conductors which are provided at the output conductors of the switch matrices 51–54 are identical. Even if not identical, there has been no attempt to coordinate the individual switch matrices 51–54 with one another. Heretofore, it has been the practice to use reduced switch matrices for the matrices 51–54 in order to reduce the die area used. Typically, these reduced switch matrices, whether of the first or the second pattern described above, have each utilized fifty percent of the number of switching devices as are used by a full connection matrix. As has been explained, the second random pattern of switch distribution provides less than one hundred percent coverage of the possible input connections in a one-half sized matrix. Moreover, when the size of the first shifting sequence pattern of switches is reduced to fifty percent, this is accomplished by truncating the pattern after the number of switches reaches the fifty percent number. As pointed out, the coverage of a pattern using a number of switches below 57% of the switches used in a full switch matrix is less than one hundred percent and less than the coverage of the random pattern. This may be ready determined by reviewing FIG. 3a. For example, if the matrix is truncated after the sixth row, of FIG. 3a, each input conductor connects to only two output conductors.

As pointed out, when a plurality of these reduced size switch matrices of either the first or the second pattern are used in field programmable gate arrays, the prior art arrangements have duplicated each of the reduced size matrices however many times is required to fit the particular layout desired. Consequently, neither pattern has provided all input combinations of four signals on the output conductors. It is desirable to assure a user that all combinations are available. For example, a user may know which combinations must be provided when an array is first programmed. However, changes in other circuitry within the system may require programming changes in a programmable gate array at some later date. If the new combinations are not available, the array is useless.

The present invention solves this problem and assures the user that all combinations of input signals will be available on the output conductors for either pattern of reduced switch matrix.

The present invention rather than providing a plurality of identical smaller matrices in a gate array, utilizes matrices in which the pattern varies from matrix to matrix so that each matrix assists in providing coverage which may be missed by another matrix. In general, a first matrix begins a pattern, a second matrix carries on that pattern, a third matrix carries on the pattern until one hundred percent coverage is attained. Then additional ones of the smaller matrices may repeat patterns offered by the first matrices in the plurality. In some cases, the pattern continued from matrix to matrix is the same pattern; while in other cases, the pattern of one matrix is the reciprocal of the pattern of another matrix. In any case, the patterns which follow the earliest pattern are coordinated to complete the coverage provided by the earliest pattern in order to provide complete overall coverage.

More specifically, a first matrix of the shifting pattern type provides one-half the number of switches necessary to a full connection matrix and completes a fixed number of sequences or cycles of input conductors. When the first matrix pattern is truncated, that pattern is continued in the next matrix (and in a next, if necessary) until the desired one hundred percent coverage is attained. For example, in a matrix such as that described in FIG. 5, a first small matrix offers b 24input signals and 8 output signals. In a full connection matrix this would require 192 switches. In a reduced switch matrix of one-half size, twelve rows of switches would connect some number (four) of cycles of the twenty-four input conductors to eight columns of output conductors. A one hundred percent coverage matrix can be produced by providing 17 rows of switches which would provide (17×8/24) cycles of input conductors. Consequently, two more cycles of input conductors are needed in order to provide full coverage.

This may be provided by continuing the pattern of the first matrix which is truncated at one-half into the next matrix. Thus, if the pattern of FIG. 3a is truncated after the first six rows of switches to provide a first reduced switch matrix, then the pattern of shifting sequences of input conductors continues into the next reduced switch matrix by providing the seventh, eighth and ninth rows which have been removed from the first reduced switch matrix as the first three rows of the second matrix. The pattern may in fact be carried out through the second matrix. In either case the first and second reduced matrices together provide the one hundred percent coverage desired for the number of input conductors. The third and fourth matrices may be duplicates of the first and second since the pattern is already sufficient to provide the desired coverage. Thus, by continuing the pattern of the first matrix into the second, one hundred percent coverage is assured.

One hundred percent coverage may be provided in the second type or random pattern of switch matrix by providing a first matrix with the random distribution described above and a second reduced matrix having a switch at each intersection where no switch is available in the first matrix and no switch at each intersection where a switch is available in the first. Thus, the pattern of the first matrix is carried into the second matrix in inverted form. This also guarantees that any input conductor can be connected to any output conductor so that any input combination may be realized in to overall gate array even though such input combination may not be attainable in any individual reduced switch matrix.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A switch matrix comprising:
   a plurality of reduced switch matrices, each of the reduced switch matrices comprising:
   a plurality of rows of input conductors,
   a plurality of columns of output conductors logically intersecting the rows of input conductors, and
   a plurality of switching devices each arranged to connect one of the input conductors to one of the output conductors at an intersection, the plurality of switching devices forming a pattern of logical interconnections of input conductors and output conductors, the pattern being a fraction of a total of logical intersections;
   wherein the pattern of logical interconnections in a first one of the reduced switch matrices being continued in additional ones of the reduced switch matrices until complete coverage of all possible combinations of input conductors is obtained on the output conductors.

2. A switch matrix as claimed in claim 1 in which the pattern of logical interconnections in the first one of the reduced switch matrices is continued by placing switching devices in the additional ones of the reduced switch matrices where switching devices are absent in the first reduced switch matrix and placing no switching devices in the additional ones of the reduced switch matrices where switching devices are present in the first reduced switch matrix.

3. A switch matrix as claimed in claim 1 in which the switching devices of the first one of the reduced switch matrices are randomly distributed.

4. A switch matrix as claimed in claim 3, each one of either the input or the output conductors being connected to either the output or the input conductors, respectively, by substantially the same number of switching devices.

5. A switch matrix as claimed in claim 3 in which the pattern of logical interconnections in the first one of the reduced switch matrices is continued by placing switching devices in the additional ones of the reduced switch matrices where switching devices are absent in the first reduced switch matrix and placing no switching devices in the additional ones of the reduced switch matrices where switching devices are present in the first reduced switch matrix.

6. A switch matrix as claimed in claim 3 wherein said fraction being one-half.

7. A switch matrix as claimed in claim 1 in which the pattern of logical interconnections in the first one of the reduced switch matrices is continued identically to the pattern in a next one of the reduced switch matrices from a point at which the pattern of logical interconnections in the first one of the reduced switch matrices ends.

8. A switch matrix as claimed in claim 1 in which the pattern of logical interconnections comprises:
   a first input conductor in a series of input conductors is joined by a switching device to a first output conductor in a series of output conductors,
   a next input conductor in the series of input conductors is joined by another switching device to a next output conductor in the series of output conductors,
   the pattern continuing through all of the series of output conductors until a last output conductor in the series is joined to an input conductor at which point the next input conductor in the series of input conductors is joined by a switching device to the first of the series of output conductors,
   the pattern continuing in the same manner until the last input conductor in the series of input conductors is joined by a switching device to an output conductor in the series of output conductors,
   the pattern then repeating beginning with the first input conductor in the series of input conductors being joined by a switching device to other than the first output conductor in the series of output conductors, said other of output conductors being shifted in the series of output conductors by a number of output conductors in a direction in the series of output conductors,
   the pattern continuing with a next input conductor in the series of input conductors being joined by a switching device to the next output conductor in the series of output conductors,
   the pattern continuing until the last input conductor in the series of input conductors is connected to an output conductor in the series of output conductors,
   the pattern then repeating beginning with the first input conductor being joined by a switching device to another output conductor in the series of output conductors, the another output conductor being separated from the output conductor to which the first input conductor was last connected by the same number of output conductors in the same direction in the series of output conductors.

9. A switch matrix as claimed in claim 8 in which the pattern of logical interconnections in the first one of the reduced switch matrices being continued in additional ones of the reduced switch matrices is continued by placing switching devices in the additional ones of the reduced switch matrices where switching devices are absent in the first reduced switch matrix and placing no switching devices in the additional ones of the reduced switch matrices where switching devices are present in the first reduced switch matrix.

10. A switch matrix as claimed in claim 8 wherein said fraction being one-half.

11. A programmable logic circuit comprising:
    a switch matrix comprising:
    a plurality of reduced switch matrices, each of the reduced switch matrices comprising:
    a plurality of rows of input conductors,
    a plurality of columns of output conductors logically intersecting the rows of input conductors, and
    a plurality of switching devices each arranged to connect one of the input conductors to one of the output conductors at an intersection, the plurality of switching devices forming a pattern of logical interconnections of input conductors and output conductors, the pattern being a fraction of a total of logical intersections;

wherein the pattern of logical interconnections in first one of the reduced switch matrices being continued in additional ones of the reduced switch matrices until complete coverage of all possible combinations of input conductors is obtained on the output conductors;

a plurality of AND gates connected to the output conductors; and a plurality of OR gates connected to receive output signals from the AND gates.

12. A programmable logic circuit as claimed in claim 11, in which the pattern of logical interconnections in the first one of the reduced switch matrices is continued by placing switching devices in the additional ones of the reduced switch matrices where switching devices are absent in the first reduced switch matrix and placing no switching devices in the additional ones of the reduced switch matrices where switching devices are present in the first reduced switch matrix.

13. A programmable logic circuit as claimed in claim 11 in which the switching devices of the first one of the reduced switch matrices are randomly distributed.

14. A programmable logic circuit as claimed in claim 13, each one of either the input or the output conductors being connected to either the output or the input conductors, respectively, by substantially the same number of switching devices.

15. A programmable logic circuit as claimed in claim 13 in which the pattern of logical interconnections in the first one of the reduced switch matrices is continued by placing switching devices in the additional ones of the reduced switch matrices where switching devices are absent in the first reduced switch matrix and placing no switching devices in the additional ones of the reduced switch matrices where switching devices are present in the first reduced switch matrix.

16. A programmable logic circuit as claimed in claim 13 wherein said fraction being on-half.

17. A programmable logic circuit as claimed in claim 11 in which the pattern of logical interconnections in the first one of the reduced switch matrices is continued identically to the pattern in a next one of the reduced switch matrices from a point at which the pattern of logical interconnections in the first one of the reduced switch matrices ends.

18. A programmable logic circuit as claimed in claim 11 in which the pattern of logical interconnections comprises:

a first input conductor in a series of input conductors is joined by a switching device to a first output conductor in a series of output conductors, a next input conductor in the series of input conductors is joined by another switching device to a next output conductor in the series of output conductors, the pattern continuing through all of the series of output conductors until a last output conductor in the series is joined to an input conductor at which point the next input conductor in the series of input conductors is joined by a switching device to the first of the series of output conductors, the pattern continuing in the same manner until the last input conductor in the series of input conductors is joined by a switching device to an output conductor in the series of output conductors, the pattern then repeating beginning with the first input conductor in the series of input conductors being joined by a switching device to other than the first output conductor in the series of output conductors, said other of output conductors being shifted in the series of output conductors by a number of output conductors in a direction in the series of output conductors, the pattern continuing with a next input conductor in the series of input conductors being joined by a switching device to the next output conductor in the series of output conductors, the pattern continuing until the last input conductor in the series of input conductors is connected to an output conductor in the series of output conductors, the pattern then repeating beginning with the first input conductor being joined by a switching device to another output conductor in the series of output conductors, the another output conductor being separated from the output conductor to which the first input conductor was last connected by the same number of output conductors in the same direction in the series of output conductors.

19. A programmable logic circuit as claimed in claim 18 in which the pattern of logical interconnections in the first one of the reduced switch matrices being continued in additional ones of the reduced switch matrices is continued by placing switching devices in the additional ones of the reduced switch matrices where switching devices are absent in the first reduced switch matrix and placing no switching devices in the additional ones of the reduced switch matrices where switching devices are present in the first reduced switch matrix.

20. A programmable logic circuit as claimed in claim 18 wherein said fraction being one-half.

21. A digital system comprising:

a processor;

main memory;

a bus associated with the processor and main memory; and a component joined to the bus including a switch matrix comprising:

a plurality of reduced switch matrices, each of the reduced switch matrices comprising:

a plurality of rows of input conductors, a plurality of columns of output conductors logically intersecting the rows of input conductors, and a plurality of switching devices each arranged to connect one of the input conductors to one of the output conductors at an intersection, the plurality of switching devices forming a pattern of logical interconnections of input conductors and output conductors, the pattern being a fraction of a total of logical intersections;

wherein the pattern of logical interconnections in a first one of the reduced switch matrices being continued in additional ones of the reduced switch matrices until complete coverage of all possible combinations of input conductors is obtained on the output conductors.

22. A digital system as claimed in claim 21, in which the pattern of logical interconnections in the first one of the reduced switch matrices is continued by placing switching devices in the additional ones of the reduced switch matrices where switching devices are absent in the first reduced switch matrix and placing no switching devices in the additional ones of the reduced switch matrices where switching devices are present in the first reduced switch matrix.

23. A digital system as claimed in claim 21 in which the switching devices of the first one of the reduced switch matrices are randomly distributed.

24. A digital system as claimed in claim 23, each one of either the input or the output conductors being connected to either the output or the input conductors, respectively, by substantially the same number of switching devices.

25. A digital system as claimed in claim 23 in which the pattern of logical interconnections in the first one of the reduced switch matrices is continued by placing switching devices in the additional ones of the reduced switch matrices where switching devices are absent in the first reduced switch matrix and placing no switching devices in the additional ones of the reduced switch matrices where switching devices are present in the first reduced switch matrix.

26. A digital system as claimed in claim 23 wherein said fraction being one-half.

27. A digital system as claimed in claim 21 in which the pattern of logical interconnections in the first one of the reduced switch matrices is continued identically to the pattern in a next one of the reduced switch matrices from a point at which the pattern of logical interconnections in the first one of the reduced switch matrices ends.

28. A digital system as claimed in claim 21 in which the pattern of logical interconnections comprises:

a first input conductor in a series of input conductors is joined by a switching device to first output conductor in a series of output conductors, a next input conductor in the series of input conductors is joined by another switching device to a next output conductor in the series of output conductors, the pattern continuing through all of the series of output conductors until a last output conductor in the series is joined to an input conductor at which point the next input conductor in the series of input conductors in joined by a switching device to the first of the series of output conductors, the pattern continuing in the same manner until the last input conductor in the series of input conductors is joined by a switching device to an output conductor in the series of output conductors, the pattern then repeating beginning with the first input conductor in the series of input conductors being joined by a switching device to other than the first output conductor in the series of output conductors, said other of output conductors being shifted in the series of output conductors by a number of output conductors in a direction in the series of output conductors, the pattern continuing with next input conductor in the series of input conductors being joined by a switching device to the next output conductor in the series of output conductors, the pattern continuing until the last input conductor in the series of input conductors is connected to an output conductor in the series of output conductors, the pattern then repeating beginning with the first input conductor being joined by a switching device to another output conductor in the series of output conductors, the another output conductor being separated from the output conductor to which the first input conductor was last connected by the same number of output conductors in the same direction in the series of output conductors.

29. A digital system as claimed in claim 28 in which the pattern of logical interconnections in the first one of the reduced switch matrices being continued in additional ones of the reduced switch matrices is continued by placing switching devices in the additional ones of the reduced switch matrices where switching devices are absent in the first reduced switch matrix and placing no switching devices in the additional ones of the reduced switch matrices where switching devices are present in the first reduced switch matrix.

30. A digital system as claimed in claim 28 wherein said fraction being one-half.

\* \* \* \* \*

UNITED STATES PATENT AND TRADEMARK OFFICE
CERTIFICATE OF CORRECTION

PATENT NO. : 5,572,198
DATED : November 5, 1996
INVENTOR(S) : Jay Sturges It is certified that error appears in the above-identified patent and that said Letters Patent is hereby corrected as shown below:

In column 3 at line 28 delete "grays" and insert --arrays--

Signed and Sealed this

Twenty-seventh Day of May, 1997

Attest:

BRUCE LEHMAN

*Attesting Officer*      Commissioner of Patents and Trademarks